(No Model.)
E. A. BOSTROM.
LEVELING INSTRUMENT.
No. 314,511. Patented Mar. 24, 1885.
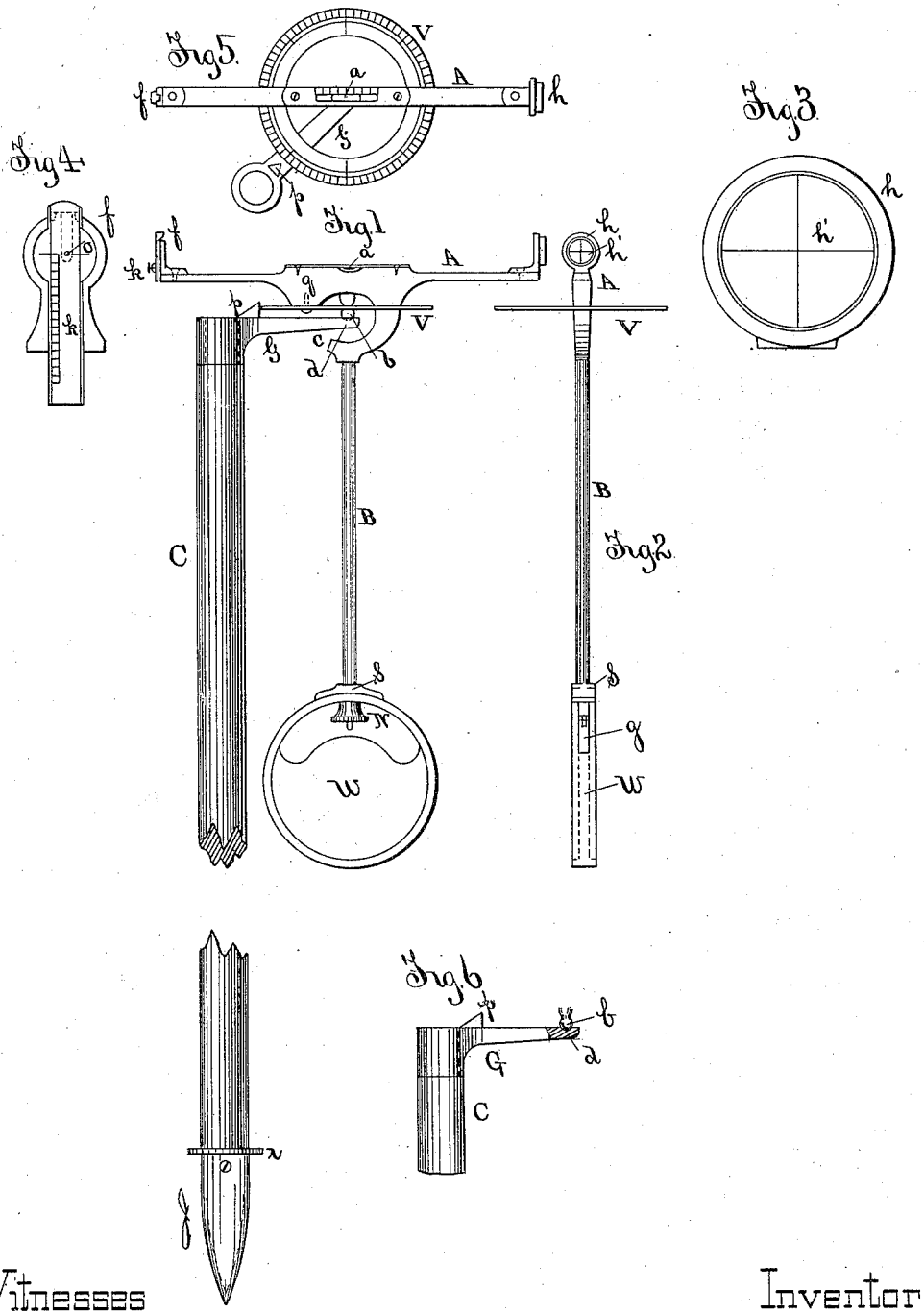

UNITED STATES PATENT OFFICE.

ERNST A. BOSTROM, OF NEWNAN, GEORGIA.

LEVELING-INSTRUMENT.

SPECIFICATION forming part of Letters Patent No. 314,511, dated March 24, 1885.

Application filed November 25, 1884. (No model.)

*To all whom it may concern:*

Be it known that I, ERNST A. BOSTROM, a citizen of the United States, and a resident of Newnan, in the county of Coweta and State of Georgia, have invented certain new and useful Improvements in Leveling-Instruments, of which the following is a specification.

My invention relates, especially, to instruments employed for running levels, and is an improvement upon the device for which Letters Patent No. 280,713 were granted to me July 3, 1883.

The object of my invention is to furnish an inexpensive instrument, adapted to the use of farmers and others in the work of running levels, grades, ditches, &c., for laying off angles, and for work of a like nature.

My invention consists, essentially, in an upright staff having an arm upon its upper extremity, whereon the level proper is supported by a spherical bearing, insuring steadiness of the instrument, the frame thereof being open on one side, giving great range. The weight and sights are made adjustable and the sights may be set for any required angle. The circle upon the level is graduated for determining angles, and the flanged metal shoe at the bottom of the staff regulates its position in the earth, all of which will be hereinafter first fully described, and then pointed out in the claim.

In the drawings, Figure 1 is a side elevation of my device, and Fig. 2 is a view in elevation of the plumb-rod and attached parts. Fig. 3 is an enlarged view of the outer sight, and Fig. 4 of the inner sight. Fig. 5 is a plan view of the level and graduated circle. Fig. 6 is a side view of the arm affixed to the upper extremity of the shaft.

Like letters of reference, wherever they occur, indicate corresponding parts in all the figures.

A is the level, provided with a spirit-tube, $a$, and with sights $f$ $h$. Sight $h$ has a cross-wire, $h'$, for determining the center or level line. Sight $f$ has a small slide, $k$, wherein is an eye-hole, $o$, corresponding to cross-wire $h'$. This slide is graduated upon one side, and can be moved upward for fixing grades. By moving said slide upward one-sixteenth of an inch it will give a grade of one inch in sixteen feet.

$b$ is the pivot or bearing point, having a rounded or spherical end, which rests in a concavity in the arm G. This gives the instrument a steady bearing, while it is free to move in a true level, the arm having an opening, $c$, in one side, which enables the instrument to turn in either direction within a range of two hundred and seventy degrees.

B is a rod connecting the level with the weight W, said rod having upon its lower extremity a small segment, S, a nut, N, below the segment engaging with the threaded end of the rod. Weight W has a groove, $g$, in the edge, through which the rod B passes, and the weight is held by the nut N. Weight W is made in the shape of a half-moon, so as to be heavy upon its lower side for adjusting the instrument.

V is a graduated circle divided into degrees, and secured to the level by a screw, $q$, the point $p$ on arm G serving to indicate angles or degrees, and by placing a pocket-compass on the top of the instrument it can be used for ordinary surveying.

C is a staff, having upon its upper extremity an arm, G, which is formed with the concave seat $d$, for receiving the pivot $b$. The staff C has upon its lower extremity a metal point, J, and a flange, $i$, which prevents the point entering the ground lower than the flange. In terracing this is of great utility, as the instrument can be moved from place to place and reset at the same height.

In using the device the staff is set in the ground and the instrument is mounted upon arm G, the gravity-rod taking a vertical position, retaining level A at a true horizontal. The instrument is adjusted by turning weight W to one side or the other, as may be required. If a grade is to be run, the slide $k$ in sight $f$ is raised as required.

The circle V is used in laying out angles.

This instrument is inexpensive, and is designed for the use of farmers, &c., serving all the purposes of the usual costly devices.

Having now fully described my invention, what I claim as new therein, and desire to secure by Letters Patent, is—

In a leveling-instrument of the character herein specified, the spherical bearing $b$, supporting the level A, whereon are sights $f$ $h$, slide $k$, adjustable weight W, circle V, staff C, having arm G, wherein is seat $d$ at top, and the pointer $p$, said staff being provided at its lower extremity with the point J and flange $i$, the whole combined and arranged to operate substantially as shown and described.

Signed at Newnan, in the county of Coweta and State of Georgia, this 30th day of August, A. D. 1844.

ERNST A. BOSTROM.

Witnesses:
WILLIAM WELLS,
JAS. A. LEE.